(12) United States Patent
Scaiano et al.

(10) Patent No.: US 10,380,381 B2
(45) Date of Patent: Aug. 13, 2019

(54) RE-IDENTIFICATION RISK PREDICTION

(71) Applicant: PRIVACY ANALYTICS INC., Ottawa (CA)

(72) Inventors: Martin Scaiano, Ottawa (CA); Andrew Baker, Ottawa (CA); Stephen Korte, Ottawa (CA)

(73) Assignee: PRIVACY ANALYTICS INC., Ottawa (CA)

(*) Notice: Subject to any disclaimer, the term of this patent is extended or adjusted under 35 U.S.C. 154(b) by 223 days.

(21) Appl. No.: 15/401,221

(22) Filed: Jan. 9, 2017

(65) Prior Publication Data

US 2017/0124351 A1   May 4, 2017

Related U.S. Application Data

(63) Continuation-in-part of application No. 15/320,240, filed as application No. PCT/CA2016/050381 on Apr. 1, 2016.

(60) Provisional application No. 62/193,024, filed on Jul. 15, 2015.

(51) Int. Cl.
   *G06F 21/62*   (2013.01)
   *H04L 29/06*   (2006.01)

(52) U.S. Cl.
   CPC ...... *G06F 21/6254* (2013.01); *H04L 63/0421* (2013.01); *H04L 63/1433* (2013.01)

(58) Field of Classification Search
   CPC ............. G06F 21/6254; H04L 63/0421; H04L 63/1433

USPC .......................................................... 726/25
See application file for complete search history.

(56) References Cited

U.S. PATENT DOCUMENTS

| | | | |
|---|---|---|---|
| 9,442,980 B1 | 9/2016 | Trepetin | |
| 2002/0169793 A1 | 11/2002 | Sweeney | |
| 2003/0061510 A1 | 3/2003 | Hartmann | |
| 2010/0077006 A1* | 3/2010 | El Emam | G06F 17/30536 707/785 |
| 2010/0100577 A1 | 4/2010 | Middleton | |
| 2010/0114840 A1 | 5/2010 | Srivastava | |
| 2010/0332537 A1 | 12/2010 | El Emam et al. | |
| 2011/0178943 A1* | 7/2011 | Motahari | G06F 21/6254 705/325 |
| 2011/0258206 A1 | 10/2011 | El Emam | |
| 2014/0019194 A1* | 1/2014 | Anne | G06Q 10/06393 705/7.28 |

(Continued)

OTHER PUBLICATIONS

Diaz, C. et al., "Information Theory and Anonymity", Proceedings of the 23rd Symposium on Information Theory in the Benelux, Louvain la Neuve, Belgium, (8 pages total) (May 29, 2002).

(Continued)

*Primary Examiner* — Michael Pyzocha
*Assistant Examiner* — Zoha Piyadehghibi Tafaghodi
(74) *Attorney, Agent, or Firm* — John Maldjian; Maldjian Law Group LLC

(57) ABSTRACT

System and method to predict risk of re-identification of a cohort if the cohort is anonymized using a de-identification strategy. An input anonymity histogram and de-identification strategy is used to predict the anonymity histogram that would result from applying the de-identification strategy to the dataset. System embodiments compute a risk of re-identification from the predicted anonymity histogram.

17 Claims, 4 Drawing Sheets

(56) References Cited

U.S. PATENT DOCUMENTS

| | | | |
|---|---|---|---|
| 2014/0081652 A1* | 3/2014 | Klindworth | G06Q 10/10 705/2 |
| 2014/0189858 A1 | 7/2014 | Chen et al. | |
| 2014/0304244 A1 | 10/2014 | Toyoda | |
| 2015/0007249 A1 | 1/2015 | Bezzi | |
| 2015/0033356 A1 | 1/2015 | Takenouchi | |
| 2015/0067602 A1 | 3/2015 | Bernstein | |
| 2015/0128285 A1 | 5/2015 | Lafever et al. | |
| 2015/0169895 A1 | 6/2015 | Gkoulalas-Divanis et al. | |
| 2015/0356591 A1 | 12/2015 | Fano | |
| 2016/0034703 A1 | 2/2016 | Dubov | |
| 2016/0203172 A1 | 7/2016 | Attaluri | |
| 2016/0248799 A1* | 8/2016 | Ng | H04L 63/1433 |
| 2017/0243028 A1 | 8/2017 | LaFever | |
| 2018/0114037 A1 | 4/2018 | Scaiano | |

OTHER PUBLICATIONS

Bezzi, M., "An Entropy based method for measuring anonymity"Proceedings of the IEEE Third International conference on Security and Privacy in Communications Networks and the Workshops, SecureComm 2007, Nice, France, (5 pages, total) (Sep. 17, 2007).

Kounine, A et al., "Assessing Disclosure Risk in Anonymized Datasets", Proceedings of FloCon2008, Savannah, Georgia, USA, (4 pages total) (Jul. 1, 2008).

Serjantov, A et al., "Towards an Information Theoretic Metric for Anonymity", Proceedings of the Second International Workshop on Privacy Enhancing Technologies, PET 2002, San Francisco, CA, USA, (14 pages total) (Apr. 14, 2002).

Diaz, C. et al., "Towards measuring anonymity", Proceedings of the Second International Workshop on Privacy Enhancing Technologies, PET 2002, San Francisco, CA, USA, (15 pages total) (Apr. 14, 2002).

Trabelsi, S. et al., "Data Disclosure Risk Evaluation", Proceedings of the Fourth International Conference on Risks and Security of Internet and Systems (CRISIS 2009), Toulouse, France, pp. 35-42 (8 pages total) (Oct. 19, 2009).

Toth, G. et al., "Measuring Anonymity Revisited", Proceedings of the Ninth Nordic Workshop on Secure IT, Espoo, Finland, (6 pages total) (Apr. 11, 2004).

Airoldi, E.M. et al., "An entropy approach to disclosure risk assessment: Lessons from real applications and simulated domains", Decision Support Systems, vol. 51, issue 1, pp. 10-20, (11 pages total) (Jan. 4, 2011).

International Search Report and Written Opinion dated Jun. 5, 2016 issued in connection with International Application No. PCT/CA2016/050381 (10 pages total).

* cited by examiner

300

400

RE-IDENTIFICATION RISK PREDICTION

CROSS-REFERENCE TO RELATED APPLICATIONS

This application is a continuation-in-part of U.S. patent application Ser. No. 15/320,240, filed on Dec. 19, 2016, which claims benefit and priority to International Application No. PCT/CA2016/050381, filed Apr. 1, 2016, which claims priority to U.S. Provisional Application No. 62/193,024 filed Jul. 15, 2015, the entire contents of which are hereby incorporated by reference in its entirety.

BACKGROUND

Field

The present disclosure relates to risk assessment of datasets and in particular to reducing re-identification risk of a dataset.

Description of Related Art

Personal information is continuously captured in a multitude of electronic databases. Details about health, financial status and buying habits are stored in databases managed by public and private sector organizations. These databases contain information about millions of people, which can provide valuable research, epidemiologic and business insight. For example, examining a drugstore chain's prescriptions can indicate where a flu outbreak is occurring. To extract or maximize the value contained in these databases, data custodians often must provide outside organizations access to their data. In order to protect the privacy of the people whose data is being analyzed, a data custodian will "de-identify" or "anonymize" information before releasing it to a third-party. An important type of de-identification ensures that data cannot be traced to the person about whom it pertains, this protects against "identity disclosure".

When de-identifying records, removing just direct identifiers such as names and addresses is not sufficient to protect the privacy of the persons whose data is being released. The problem of de-identification involves personal details that are not obviously identifying. These personal details, known as quasi-identifiers, include the person's age, sex, postal code, profession, ethnic origin and income, financial transactions, medical procedures, and so forth. De-identification of data requires an assessment of the risk of re-identification.

Re-identification risk is measured on the data set to ensure that, on average, each individual has a certain level of anonymity. If the risk of a data set is too great, fields will need to be generalized or suppressed according to a de-identification scheme. In order to determine if the de-identification scheme is acceptable, the de-identification steps are performed and a risk measurement is done. These can be very time consuming steps, often measured in hours or days, and the result may be that the re-identification risk after applying a de-identification scheme still may be too high. Thus, the user must iterate on a process requiring hours or days of processing per iteration, adding up to very long process.

Once the risk is determined, the risk may be reduced if necessary by use of suppression. Suppression is a risk mitigation technique that removes a field value from a dataset in order to lower risk. For example, suppose a re-identification risk of a database is measured. If the measured risk needs to be lowered, suppression may modify a field in the database by replacing actual data in the field with an analytic model of what the data in the field should be. However, if suppression is not done intelligently, the suppression may introduce problems in a returned dataset, and may take a relatively long time to produce a sufficiently anonymized dataset, i.e., a dataset that has been de-identified.

Previously, in order for a de-identification scheme to be proved appropriate, the de-identification steps would need to be performed and the re-identification risk subsequently measured. These are both time intensive procedures. Furthermore, a de-identification scheme may only minimally affect risk, despite the scheme involving major modifications to the data set. Thus, trying several de-identification schemes may be necessary before finding an adequate scheme.

Previous techniques in the background art for suppression included picking values (e.g., picking a data field for all records in a database, or picking only specific records having predetermined value(s) in the data field), nulling out the picked values, re-measuring the re-identification risk, and then reiterating in a loop if the re-identification risk is still too high. In the background art, this iterative process was found to take excessive time to converge to a an acceptable solution, e.g., hours or days. In some cases, time to converge would be unknown because the process would be aborted by users as having exceeded their user tolerance.

Accordingly, systems and methods that enable improved risk assessment remains highly desirable.

BRIEF SUMMARY

Embodiments in accordance with the present disclosure provide a system and method to calculate a re-identification risk and predict a suppression that would be highly effective in reducing the re-identification risk.

Embodiments in accordance with the present disclosure use patients' anonymity (determined during the initial risk measurement) to predict what the risk will be after a particular de-identification scheme is implemented, without having to do the de-identification and perform a risk measurement. This saves users a significant amount of time by avoiding iteration, and gives a realistic expectation of the changes to risk. In addition, this approach helps users predict the effect of de-identification on risk, which is currently very difficult to predict.

An ability to make predictions enables embodiments to process a dataset in only a single pass, in contrast to methods of the background art that iteratively suppress by a trial amount, test for low risk, and repeat until adequate suppression is achieved. Before applying suppression, embodiments predict the risk after suppression if a certain amount would be applied. If the prediction is below the threshold then embodiments suppress by that certain amount. Embodiments are able to achieve acceptable levels of re-identification risk typically in only one pass.

Embodiments also provide a computational framework for future improvement that allows for substitution of different computational modules in order to provide additional suppression techniques. The smart suppression technique, which works within the computational framework, maintains better data quality and more efficiently lower risk of re-identification than previously naive or uninformed methods of the background art.

Embodiments perform local recoding, which is a more general version of suppression. Local recoding changes the value to something more meaningful and more accurate instead of completely deleting the value. For example, local recoding may replace a value with another value at a different generalization, instead of deleting or replacing the value with a NULL.

Embodiments in accordance with the present disclosure include a system and a method to produce an anonymized cohort using a predetermined de-identification strategy, members of the cohort having less than a predetermined risk of re-identification. The method includes receiving a query via a communication channel coupled to a processor, the query comprising a request to predict the risk of re-identification based on an anonymity histogram and de-identification strategy, transforming the anonymity histogram based on the de-identification strategy, computing a predicted risk of re-identification, and returning, via the communication channel, the predicted risk of re-identification.

Embodiments expedite the anonymization process. A faster process allows an analyst to complete projects in less time, and allowing the analyst to complete more projects overall. Embodiments help enable a smaller workforce to do the job of a larger workforce. Embodiments need less processing power, thus reducing the requirements of a processing platform needed to practice the embodiments.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein.

Figure 1:
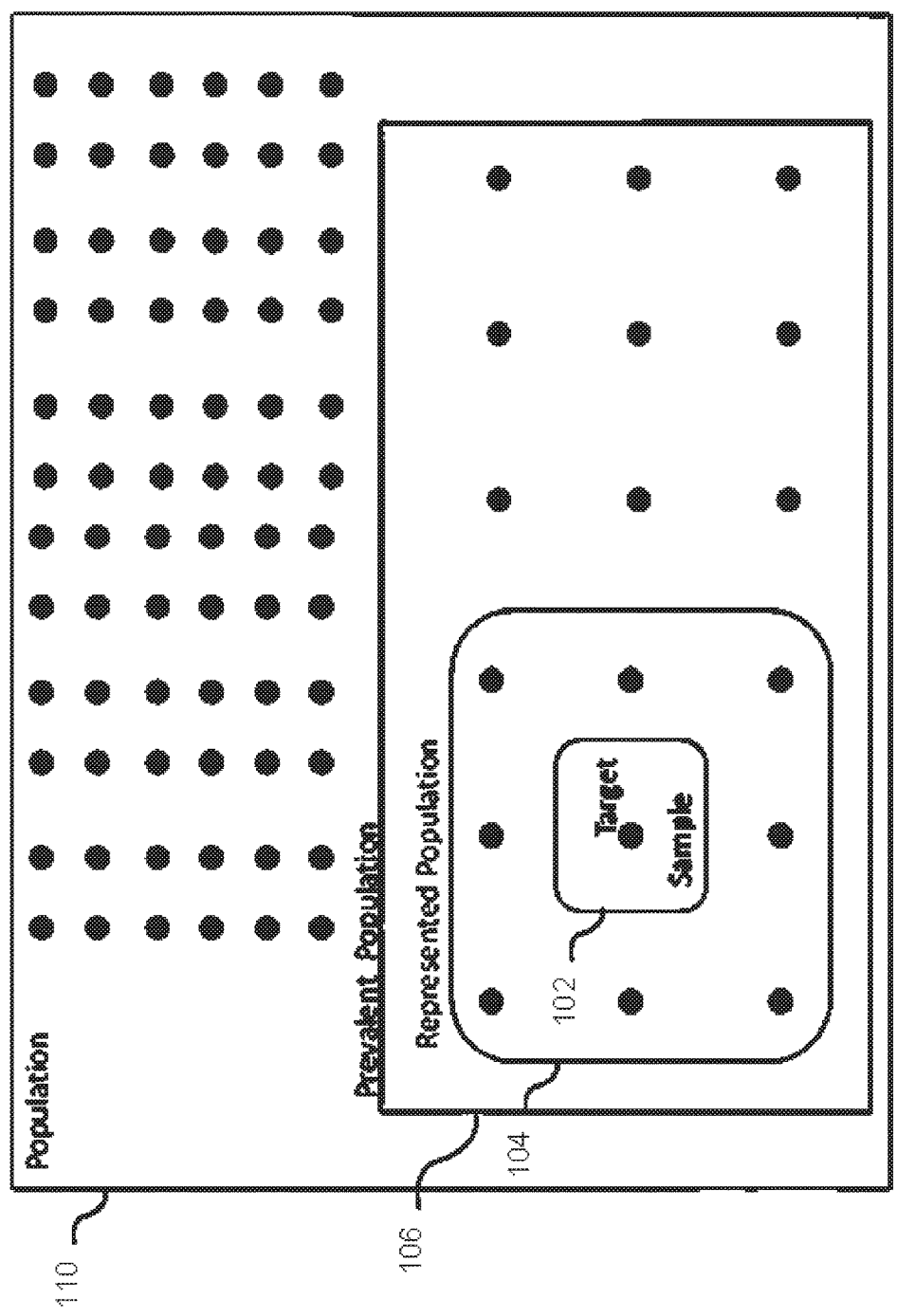
FIG. 1 shows a representation of a sample population in accordance with an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary computing and storage system. Although well suited for use with, e.g., a system using a server(s), data sources and/or database(s), the disclosure is not limited to use with any particular type of computing, communication and storage system or configuration of system elements. Those skilled in the art will recognize that the disclosed techniques may be used in any computing, communication and storage application in which it is desirable to store protected data, such as medical data, financial data, educational records data, etc.

As used herein, the term "module" refers generally to a logical sequence or association of steps, processes or components. For example, a software module may include a set of associated routines or subroutines within a computer program. Alternatively, a module may comprise a substantially self-contained hardware device. A module may also include a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing sets of computer code in a processor that performs the function; providing provisionable configuration parameters that control, limit, enable or disable capabilities of the module (e.g., setting a flag, setting permissions, setting threshold levels used at decision points, etc.); providing or removing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; setting a value of an adjustable component (e.g., a tunable resistance or capacitance, etc.), energizing a circuit that performs the function (e.g., providing power to a transceiver circuit in order to receive data); providing the module in a physical size that inherently performs the function (e.g., an RF antenna whose gain and operating frequency range is determined or constrained by the physical size of the RF antenna, etc.), and so forth.

As used herein, the term "transmitter" may generally include any device, circuit, or apparatus capable of transmitting a signal. As used herein, the term "receiver" may generally include any device, circuit, or apparatus capable of receiving a signal. As used herein, the term "transceiver" may generally include any device, circuit, or apparatus capable of transmitting and receiving a signal. As used herein, the term "signal" may include one or more of an electrical signal, a radio signal, an optical signal, an acoustic signal, and so forth.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes a computer readable signal medium such as a propagating signal. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Embodiments are described below, by way of example only, with reference to FIGS. 1-4. The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Certain sensitive personal information like patient health information is protected by law (e.g., Healthcare Information Portability and Accountability Act ("HIPAA," codified at 42 U.S.C. § 300 gg and 29 U.S.C § 1181 et seq. and 42 USC 1320d et seq.) in the U.S.) and must be treated in a way that maintains patient privacy. Such information is termed protected health information (PHI). With respect to PHI, it is important to avoid disclosing the PHI of a specific patient, or to disclose PHI so specific that it discloses an identity of a specific patient. All stake-holders involved must accept their stewardship role for protecting the PHI data contained within. It is essential that systems that access the PHI do so in full compliance with HIPAA and any other applicable laws or regulations of the country concerned, and in a secure manner.

Patient information, including PHI, is sometimes needed for medical studies. For example, observational studies are an important category of study designs. For some kinds of investigative questions (e.g., related to plastic surgery), randomized controlled trials may not always be indicated or ethical to conduct. Instead, observational studies may be the next best method to address these types of questions. Well-designed observational studies may provide results similar to randomized controlled trials, challenging the belief that observational studies are second-rate. Cohort studies and case-control studies are two primary types of observational studies that aid in evaluating associations between diseases and exposures.

Three types of observational studies include cohort studies, case-control studies, and cross-sectional studies. Case-control and cohort studies offer specific advantages by measuring disease occurrence and its association with an exposure by offering a temporal dimension (i.e. prospective or retrospective study design). Cross-sectional studies, also known as prevalence studies, examine the data on disease and exposure at one particular time point. Because the temporal relationship between disease occurrence and exposure cannot be established, cross-sectional studies cannot assess the cause and effect relationship.

Cohort studies may be prospective or retrospective. Retrospective cohort studies are well-suited for timely and inexpensive study design. Retrospective cohort studies, also known as historical cohort studies, are carried out at the present time and look to the past to examine medical events or outcomes. A cohort of subjects, selected based on exposure status, is chosen at the present time, and outcome data (i.e. disease status, event status), which was measured in the past, are reconstructed for analysis. An advantage of the retrospective study design analysis is the immediate access to the data. The study design is comparatively less costly and shorter than prospective cohort studies. However, disadvantages of retrospective study design include limited control the investigator has over data collection. The existing data may be incomplete, inaccurate, or inconsistently measured between subjects, for example, by not being uniformly recorded for all subjects.

Some medical studies, such as retrospective cohort studies, may involve authorized access by medical researchers to anonymized PHI, i.e., to PHI that ideally is not identifiable with the original patient. However, in practice there is nonzero risk that the anonymized data may be re-identified back to the original patient, for example, if data selection criteria is excessively narrow, thus risking that a very small pool of patients meet the selection criteria.

Databases or datasets generated therefrom that contain personally identifiable information such as those used in medical and financial information can include a cross-sectional data (L1) in addition to longitudinal data (L2). Cross-sectional data includes a single record for each subject. A dataset is longitudinal if it contains multiple records related to each subject and the number of records may vary subject to subject. For example, part of a longitudinal dataset could contain specific patients and their medical results over a period of years. Each patient may have varying times and number of visits. In general a patient will only have a single gender, birthday, or ethnicity, which is consistent throughout his/her life. Longitudinal data are those values which exist an unknown number of times per patient. A patient may receive only a single diagnosis, or may be diagnosed with multiple different diseases. Some patients may not have any values for some longitudinal quasi-identifiers (QIs). An L2 group refers generically to a set of values drawn from one or more longitudinal tables which can be relationally linked together. A dataset may have more than one L2 group which cannot be inter-connected.

Such datasets are valuable in research and analytics, however the use of the datasets can provide an opportunity for attackers to determine personally identifiable information resulting in a data breach. In medical databases a patient can have multiple events based upon for example diagnoses, procedures, or medical visits defining L2 data.

Traditionally, if a risk of re-identification for a dataset is estimated to be too high (compared to a settable threshold), the estimated risk is reduced by use of one or more of several techniques to perturb the data, such as suppressing the search results entirely, intentional suppression of specific matching returned records, inclusion of patient data from a wider selection criteria (e.g., a wider age band), intentionally returning patient records that do not meet all of the selection criteria, and so forth. However, these techniques necessarily degrade the returned data, with resulting effects on any findings based upon the degraded returned data. Therefore, estimation of the risk of re-identification is important, because overestimating the risk will result in a patient dataset that has been unnecessarily degraded, but underestimating the risk will result in release of data that is overly susceptible to re-identification.

When a risk measurement is performed on a data set, each patient's anonymity is collected into a histogram. The histogram is a graph or table that gives a summary of the anonymity of patients, from which the re-identification risk can be precisely computed. The histogram can be transformed to predict the histogram resulting from a data transformation, such as generalizing date of birth to year of birth. An exemplary anonymity histogram is shown below in Table 1, where the columns are population anonymity, the rows are sample anonymity, and the cells contain the number of population with this combination of population and sample anonymity.

TABLE 1

| Sample | Population Anonymity | |
|---|---|---|
| Anonymity | 1 | 2 |
| −1 | 34 | 37 |
| 0 | 36 | 42 |
| 1 | 57 | 87 |

The anonymity histogram illustrates a sample anonymity in the left column, and the rows illustrate population anonymity. Anonymity is a integer value. We always represent it as integers. Table 1 illustrates sample anonymities of −1, 0 and 1. In the example of Table 1, 34 people have a population anonymity of 1 in the sample, and the anonymity of −1.

Anonymity is calculated on a per patient basis using the anonymity histogram. For every patient, an individual anonymity is calculated. After all patients in the population have been assigned to a cell in the anonymity histogram, embodiments have an array (or matrix) that indicates, for each of these anonymities, how many people had that anonymity. Non-integer values of anonymities are interpreted as counting in part toward more than one anonymity bucket or cell. However, integer representation of the anonymity histogram provides computational efficiencies.

Embodiments in accordance with the present disclosure provide a novel solution to a novel problem, how to predict the risk of re-identification of a dataset without actually applying the de-identification and risk measurement process to the dataset. De-identification and risk measurement are computationally costly (i.e., slow) processes, while prediction is computationally cheap (i.e., fast). The predictive process takes the anonymity histogram as an input, applies a transformation that represents a data transformation to facilitate de-identification, and produces a new histogram. The anonymity histogram represents a summary of the re-identification risk, which can be computed from the transformed anonymity histogram. Process 300 (FIG. 3) represents this process and is described below in further detail.

The histogram contains counts of patients (H(A,a)) with anonymity "a" in the data set (i.e., a sample anonymity) and anonymity "A" in the prevalent population (i.e., a population anonymity). The collection of patient's anonymity may be used to directly calculate an average re-identification risk of the data set. The average re-identification risk of an attacker attempting to re-identify someone in the data set who is from the prevalent population is given below in Equation (1).

$$\text{Risk\_a} = \frac{\Sigma_a \frac{\Sigma_A H(A, a)}{2^{max(0,a)}}}{\Sigma_a \Sigma_A \frac{2^{max(0,A)}}{2^{max(0,a)}} H(A, a)} \quad (1)$$

Risk_a may be referred to as the risk of an acquaintance attack, also known as the population to sample attack, (e.g., involving knowledge that someone suffered from skin cancer). For example, suppose the dataset has 50% of the individuals with skin cancer in the United States. Embodiments may consider the size of the dataset, but the dataset in question does not contain everyone with skin cancer in the U.S. That condition has to be met for these equations to be relevant. Risk_a indicates a probability that someone wanting to re-identify a patient in the dataset would personally know someone with skin cancer in the United States. However, just because an attacker knows someone who has skin cancer, it does not necessarily mean that the acquaintance of the attacker is in fact in the dataset, because the dataset is not a complete registry of skin cancer cases. More broadly, the model models a chance that an acquaintance with skin cancer is in fact in the dataset. Assuming that is true, embodiments select what to examine in the dataset.

The average re-identification risk of an attacker attempting to re-identify someone in the prevalent population who is in the sample is given below in Equation (2), where n is the number of individuals in the data set:

$$\text{Risk\_p} = \frac{1}{n} \cdot \Sigma_A \frac{1}{2^{max(0,A)}} \cdot \Sigma_a H(A, a) \quad (2)$$

Risk_p refers to a public risk or public attack, also known as the sample to population attack. For example, an attacker has access to the dataset and is trying to re-identify a patient in the dataset, specifically that the attacker is trying to re-identify the patient in the general population. The attacker may observe various quasi-identifiers (QIs), and may have access to another database that relates some of these QIs to direct identifiers. The attacker may try to link QIs with direct identifiers. For example, QIs may indicate a male, living in zip code 90210, who is 53 years of age. Public records (e.g., a voter registry) may reveal ten people nationwide with those characteristics.

A de-identification strategy including a combination of field generalization, cell suppression and subsampling will transform the patient's anonymity in a manner that embodiments can estimate.

Regarding cell suppression, the amount of information that the particular cell contributes to a patient's total information score is calculated during the preliminary risk measurement. Cell suppression will affect a patient's anonymity as given below in Equation (3):

$$A_{after}=A_{before}+\text{Information of QI suppressed} \quad (3)$$

Regarding generalization, embodiments estimate that a patient's shift in anonymity within the prevalent population by considering the relative sizes of the field values being measured, as given below in Equation (4):

$$A_{after} = A_{before} + \log_2 \frac{\text{size}_{after}}{\text{size}_{before}} \quad (4)$$

For example, if generalizing an exact date to its month and year, the ratio will be 12/1.

The shift used to estimate generalization may also be computed more accurately by other methods, such as examination of the single variable distribution of dates, computing the entropy before generalization and after generalization, and subtracting these two entropy values. For many variables, such as date of birth or zip code, distributions are often known at the time of prediction, and generalization of a single variable distribution is also computationally cheap. Note that entropy is already in a $\log_2$ scale and subtraction in a log scale is the same as division in a non-log scale. Using this type of estimate, Equation (4) may be restated as shown below in Equation (5) where H is entropy:

$$A_{after}=A_{before}+H_{after}-H_{before} \quad (5)$$

Equations (3)-(5) provide the transformation of population anonymity (A), however histograms also include sample anonymity. The population anonymity can be used to estimate the change a sample anonymity (a) when applying a generalization or suppression using Equation (6) below:

$$a_{after} = \log_2\left(2^{max(0,a_{before})} + \left(2^{max(0,A_{after})} - 2^{max(0,A_{before})}\right) \cdot \frac{\text{rep\_pop}}{\rho\_\text{pop}} \cdot \frac{2^{max(0,a_{before})}}{2^{max(0,A_{before})}}\right) \quad (6)$$

For each patient these post-de-identification anonymities may be collected into new histogram and a resultant risk estimate can be calculated using Equations (1)-(2).

Regarding sub-sampling, an estimated risk can be calculated directly as given below in Equations (7)-(9):

$$\text{Risk\_a} = \frac{\sum_a \frac{\sum_a H(A, a)}{2^{max(0,a)}} - J_{lost}}{\sum_a \sum_A \frac{2^{max(0,A)}}{2^{max(0,a)}} \cdot H(A, a) - \text{rep\_pop}_{lost}} \quad (7)$$

$$J_{lost} = \sum_a \sum_A \frac{H(A, a)}{2^{max(0,a)}} \cdot (1 - \text{sub\_sf})^{2^{max(0,a)}} \quad (8)$$

$$\text{rep\_pop}_{lost} = \sum_a \sum_A \frac{H(A, a)}{2^{max(0,a)}} \cdot (1 - \text{sub\_sf})^{2^{max(0,a)}} \cdot 2^{max(0,A)} \quad (9)$$

In Equations (6)-(9), p_pop refers to a prevalent population, e.g., everyone with skin cancer in the United States. More generally, p_pop is the number of people who could be in the dataset, given knowledge of a condition. The variable sub_sf refers to a subsampling fraction. Subsampling refer to a technique to lower the risk in a dataset by choosing a random sample (i.e., a subset) from the dataset, with subsampling fraction denoting a ratio of the size of the chosen subset to the dataset's entire size. For example, in the case of a skin cancer dataset, if a prevalent population is everyone in the U.S., and datasets contain 50% of those individuals, then a subsampling fraction is ½.

Embodiments in accordance with the present disclosure provide an improved estimation of a risk of re-identification, an improved estimation of how to reduce the risk, and an improved throughput. Improved estimation helps avoid unnecessary degradation of patient data used for medical studies, and helps avoid release of data that is susceptible to re-identification. Patient privacy is enhanced, and medical studies have access to better quality data.

Exemplary populations 110, 106, 104 and a sample 102 are described in relation to FIG. 1. The sample 102 in this case contains one person, the target. Sample 102 represents nine people 104 in the represented population 104, i.e. the target looks like eight other people in the represented population 104.

The sample 102 contains a randomly selected person from the prevalent population 106. This is the group of people who could be in the dataset. i.e., if the dataset is about cancer, then the prevalent population 106 is all people who have cancer. In this example the prevalence is ⅕, or 18 people have breast cancer and could be in the dataset. This group of 18 people will be called the prevalent population 106 to indicate the relationship to disease and that population size*prevalence=prevalent population size.

The sample 102 is a subset of the prevalent population 106, one patient in this case, and the one patient looks similar only to half of prevalent population 106. Thus, k=1, K=9, and N=18, where N is the prevalent population size.

The population 110 contains everyone, even people who do not have cancer. The sampling fraction is defined as the ratio between the sample 102 and the prevalent population 106. The represented fraction is defined as the ratio between the sample 102 and the represented population 104. From this point on, the prevalent population 106 will be referred to as the population.

In embodiments, Quasi-Identifiers (QIs) are sub-divided into categories based on the largest (i.e., most general) group of people who can know a piece of information, either public information or acquaintance information.

Public information: This information (i.e., data) is either publically available or the recipient has this data. Public data should be structured, accessible to the recipient, and cover a large portion of the population, such as 1% or greater. A good test for public information is "could the recipient look up this value for a large percentage of randomly selected people." While self-disclosure and newspapers are public information, they are not structured and do not cover a large part of the population.

Acquaintance information: This is information about one person (i.e., the subject) that may be known by a second person (i.e., the acquaintance) if the acquaintance is familiar with the subject, or if the acquaintance sees the subject. Once known, the acquaintance information becomes acquaintance knowledge. Acquaintance knowledge also includes public information on celebrities and public figures that have their personal lives disclosed.

Acquaintance knowledge is not required to be structured or centralized, however it should be knowable by many acquaintances. A good test is "Would at least 50% of your acquaintances know this value?"

Public QIs are considered in the public attack, while public and acquaintance QIs are considered in the acquaintance attack. Thus, two different histograms are required for these two different attacks. Because the equation for public risk may be expressed such that sample anonymity is not relevant, a one-dimensional matrix (e.g., an array or vector) may be used to represent the anonymity histogram.

Figure 2:
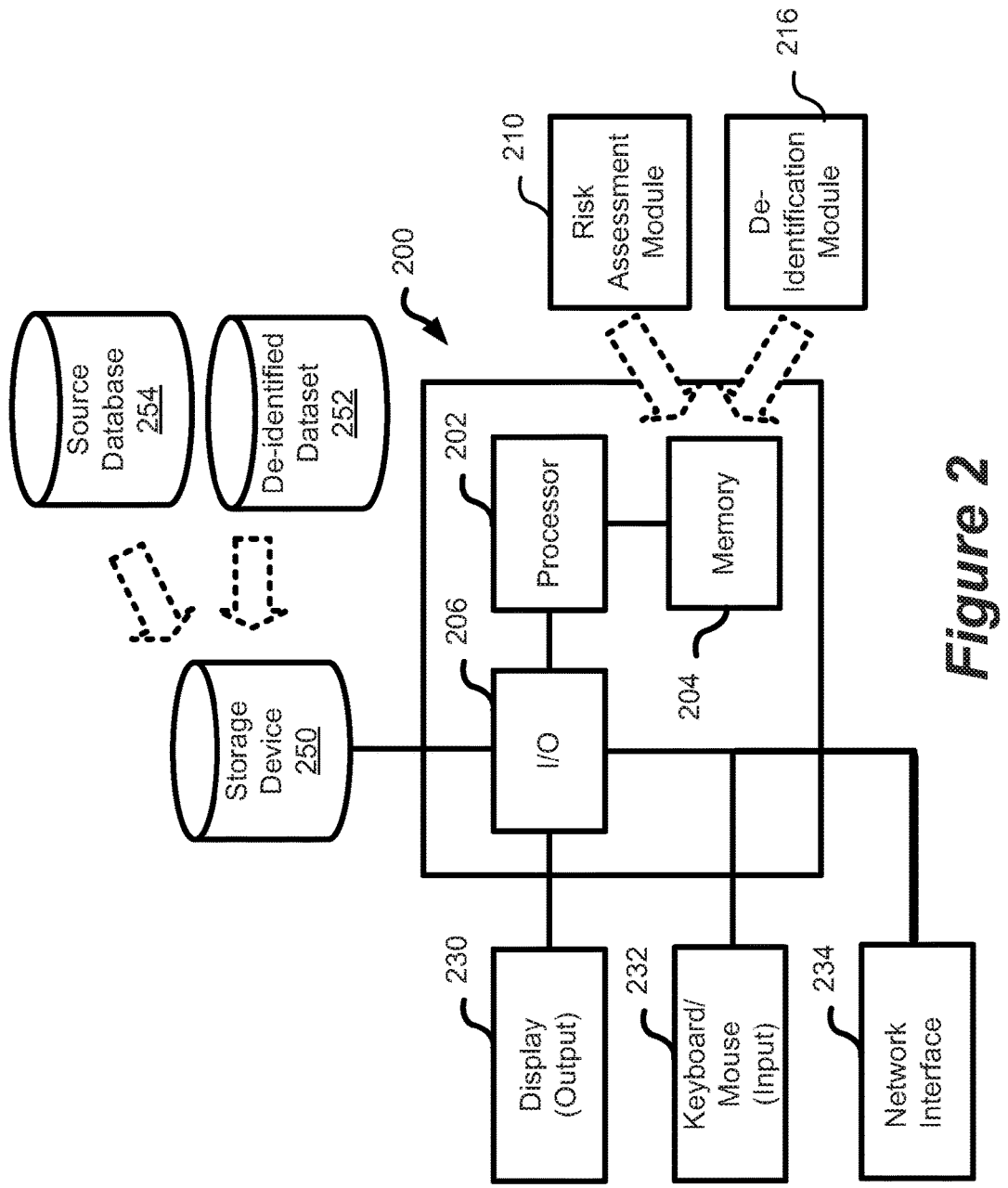
FIG. 2 shows a representation of system for determining re-identification risk of dataset in accordance with an embodiment of the present disclosure.

FIG. 2 shows a system 200 for performing risk assessment of a dataset, in accordance with an embodiment of the present disclosure. System 200 executes on a computer including a processor 202, memory 204, and input/output interface 206. Memory 204 executes instruction for providing a risk assessment module 210, which performs an assessment of re-identification risk. The risk assessment may also include a de-identification module 206 for performing further de-identification of the database or dataset based upon the assessed risk. A storage device 250, either connected directly to the system 200 or accessed through a network (not shown) stores the de-identified dataset 252 and possibly the source database 254 (from which the dataset is derived) if de-identification is being performed by the system. A display device 230 allows the user (e.g., a human user) to access data and execute the risk assessment process. Input devices such as keyboard and/or mouse provide user input to the I/O module 206. The user input enables selection of desired parameters utilized in performing risk assessment, but may also be selected remotely through a web-based interface via network interface 234. The instructions for performing the risk assessment may be provided on a computer readable memory. The computer readable memory may be external or internal to the system 200 and provided by any type of memory such as read-only memory (ROM) or random access memory (RAM). The risk assessment process can determine a risk for population to sample and sample to population type attacks in order to aid in determining quasi-identifier de-identification or anonymization strategies to be applied to the dataset.

Standard de-identification techniques known in the art include generalization, suppression, and subsampling. A set of de-identification techniques, with particular settings for particular variables, will be referred to as a de-identification strategy. A de-identification strategy describes the transformations to a dataset for the purposes of de-identification.

Embodiments in accordance with the present disclosure reduce an amount of data manipulation required in order to achieve a low risk dataset.

Embodiments provide a framework and process to predict the effects of a de-identification strategy on the anonymity histogram, and then to predict the risk of re-identification with minimal computational cost.

Embodiments in accordance with the present disclosure improve upon the background art by reducing re-identification risk to an acceptable level in one pass by use of an anonymity histogram, from a plurality of calculated anonymity values, to estimate a number of data subjects who are unique in the dataset.

The anonymity histogram may be useful to predict the effects of a data transformation and/or risk mitigation needed in order to achieve an acceptable level of re-identification risk. Techniques to produce and to use the anonymity histogram are described in parent application Ser. No. 15/320,240, the content of which is hereby incorporated by reference in its entirety. The parent document discloses a system and method to characterize probability distributions of unperturbed data.

The anonymity histogram is a novel data structure determined using information theory, in order to measure an overall risk of re-identification. Anonymity histograms are one or two-dimensional arrays (e.g., an array or matrix), where the x-axis is population anonymity (usually an integer), and optionally a y-axis with sample anonymity. Cell counts are the number of patients with that set of anonymity values.

Shannon's information theory is used in the sense that the information determines how many bits of information are needed to represent the information as binary data. More specifically, the number of binary bits needed to represent information is the negative of the base-2 logarithm of the probability distribution of that data. Entropy in an information theory sense is a measure of the randomness of an outcome. As referred to herein, an outcome that statistically is highly unlikely (e.g., membership in a group of 5 persons drawn from a nationwide population) has a relatively high level of entropy. Conversely, an outcome that statistically is not highly unlikely (e.g., membership in a group such as gender that would encompass approximately 50% of a nationwide population) has a relatively low level of entropy.

Suppose there is a dataset for which a risk measurement is to be determined. The anonymity histogram summarizes in histogram form every individual's risk score or anonymity, for use in making predictions. For example, suppose records in the dataset are to be generalized from dates of birth to just a year of birth. Because the histogram is in terms of anonymity, it includes data such as how many bits of anonymity does each patient have. A generalization from year of birth to a five-year range is roughly a 2.3-bit generalization (i.e., $-\log_2(\frac{1}{5})$). Embodiments calculate how much a patient's anonymity will shift, based on the generalization. So by generalizing year birth to five year intervals, embodiments expect everyone's anonymity to shift by 2.3 bits. This may be viewed as generalizing everyone's year of birth quasi-identifier. Alternatively, this may be viewed as generalizing a range or bucket into which the year of birth quasi-identifier is placed or compared to. This shift may be applied to the histogram to calculate a new histogram. From the new histogram, embodiments may can calculate what the risk will be from that shifted histogram. Embodiments take the histogram, find an appropriate shift for a generalization, apply the shift, and then calculate a risk estimate associated with the generalization.

This prediction process may run orders of magnitude faster than actually applying and measuring the risk on the data, with a very high degree of accuracy.

Anonymity is an output of a programmed process. For example, suppose a patient has two quasi identifiers (QIs), one being a date of birth and the other being a rare medical condition. Embodiments may calculate a probability of someone else having that date of birth, e.g., by using census data, and then calculate an information score from the probability. An exact date of birth might have about 8.5 bits of information (i.e., $\log_2(365)$). Embodiments then may consider the patient's medical history and calculate a probability of another person having the same rare medical condition, and then calculate an information score from the probability (e.g., 18 bits of information for a rare condition). Assuming independence of the information (e.g., the date of birth is unrelated to the rare medical condition, and vice versa), embodiments may add together the information content of both pieces of information (i.e., 8.5 bits+18 bits), and that totals how much we know about the patient (i.e., 26.5 bits of information).

Then embodiments compare the known information content for this patient (i.e., 26.5 bits) to a threshold. Embodiments calculate how many bits of information it takes to re-identify the patient. Embodiments take this amount of information and compare it to the population the patient is drawn from, e.g., if the patient came from a place where the population is small, the patient would be readily re-identifiable. For example, suppose it is known from other sources that it takes 23 bits of information to re-identify someone from the same locality as the patient (e.g., the State of California), and suppose that the known information about the patient has an information content equal to 26.5 bits. In this situation, the patient would be re-identifiable.

On the other hand, suppose this same patient is grouped with a larger population (e.g., the entire U.S.). Further suppose that it takes 28.3 bits of information to re-identify a person in the U.S. In this case, since the patient's anonymity of 26.5 bits is less than the 28.3 bits of information to re-identify a person in the U.S., the patient is anonymous with only 1.8 bits of anonymity, which translates to about 3-4 persons (i.e., $2^{1.8}=3.48$) persons in the U.S. who look like this patient, so the patient is not particularly anonymous but also the patient is not unique.

The anonymity score for a patient is an aggregate or a sum of all information we know already about the patient. If some of that data is changed, e.g., by translating date of birth to year of birth, the information content may go down to a smaller number (e.g., 6 bits). Embodiments may recompute a new anonymity histogram from the old anonymity histogram, patients are adjusted by the change in the information bit value. The anonymity histogram is shifted and moved for such patients.

Embodiments in accordance with the present disclosure use novel risk prediction processes and novel risk measurement processes. Embodiments also provide usage of computer-implemented data structures that are novel in this usage space. The anonymity histogram data structure combined with risk prediction using histograms helps enable selection of a de-identification strategy, including but not limited to the amount of suppression predicted to lower the risk of re-identification to an acceptable level. Embodiments in accordance with the present disclosure address the following problems and include at least the following benefits.

Previous methods of the known art require iterations of applying risk mitigation (e.g., suppression, generalization, subsampling) and risk measurement, to find a de-identification strategy with a low risk of re-identification. Consequently, previous methods are relatively slow, due in long runtime and significant computation required in each iteration. In contrast, embodiments in accordance with the present disclosure are novel at least because they can quickly predict the risk of re-identification of a de-identification strategy. A user or an automatic system may rapidly test multiple combinations of generalization, suppression, and sub sampling to find an effective or optimal de-identification strategy to create a dataset with a low risk of re-identification.

Consider a large dataset for which risk measurement may take hours or days of computation. An analyst may try a dozen or more different de-identification strategies to obtain a dataset with a low risk of re-identification. Subsequently, the analyst might try another half dozen variants of that de-identification strategy to try to optimize data quality. Only a few strategies may be tried in a single day, because of the computational cost. Processing 18 iterations would likely span days and weeks. However, the resulting risk from these strategies can be predicted in minutes or seconds using embodiments in accordance with the present disclosure. An analyst or an automated system using the embodiments can now try more strategies in the same or less time, or produce a de-identified dataset (i.e., a dataset with a low risk of re-identification) more quickly. Because of the reduction by orders of magnitude of the runtime, more time can be spent optimizing data quality.

Embodiments may include a computing environment presented to a user as a metaphorical interactive sandbox, where the user can test different de-identification strategies in realtime. Embodiments may be used by an automated system to determine an effective or optimal de-identification strategy, by searching through a large space of different combination of de-identification techniques and/or respective query parameters, and then return the data after de-identification more quickly. Embodiments may be used to determine a set of effective de-identification strategies, each strategy emphasizing data quality in different variables, and present the set of strategies to a user so the user can select a strategy.

Figure 3:
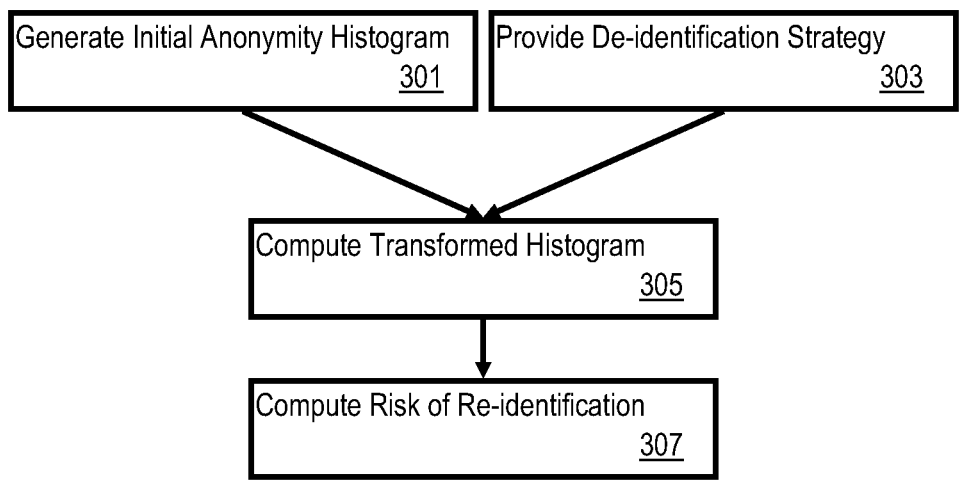
FIG. 3 shows the process predicting the risk of re-identification.

FIG. 3 illustrates a process 300 in accordance with an embodiment of the present disclosure. Process 300 illustrates a prediction process.

Process 300 begins at step 301, at which a first pass of the data is performed to obtain the anonymity histogram of the data. Completing step 301 is a major effort in a single risk measurement, to obtain the risk of re-identification for the original data. After step 301, risk on the histogram (i.e., without applying transformations) is measured.

Step 303 of process 300 provides a de-identification strategy. The provided strategy may be determined by an automatic process or by user input. This strategy may be determined and provided before, after, or in parallel with step 301. The strategy expresses a set of risk mitigation techniques to be applied to the dataset, although the techniques are not actually applied at any point during process 300, i.e., the dataset is not altered during the prediction process 300.

Next step 305 of process 300 computationally applies equations (3)-(9) in order to transform the histogram of step 301 into a predicted histogram assuming the de-identification strategy had been applied to the data. Step 305 is a predictive step, taking a known histogram and expected effects to predict an expected histogram.

Next, step 307 of process 300 applies equations (1)-(2) to the transformed and/or predicted histogram to obtain a predicted risk of re-identification. Embodiments may compute both the public risk and acquaintance risk and verify that both risk measurements have acceptably low risk.

Figure 4:
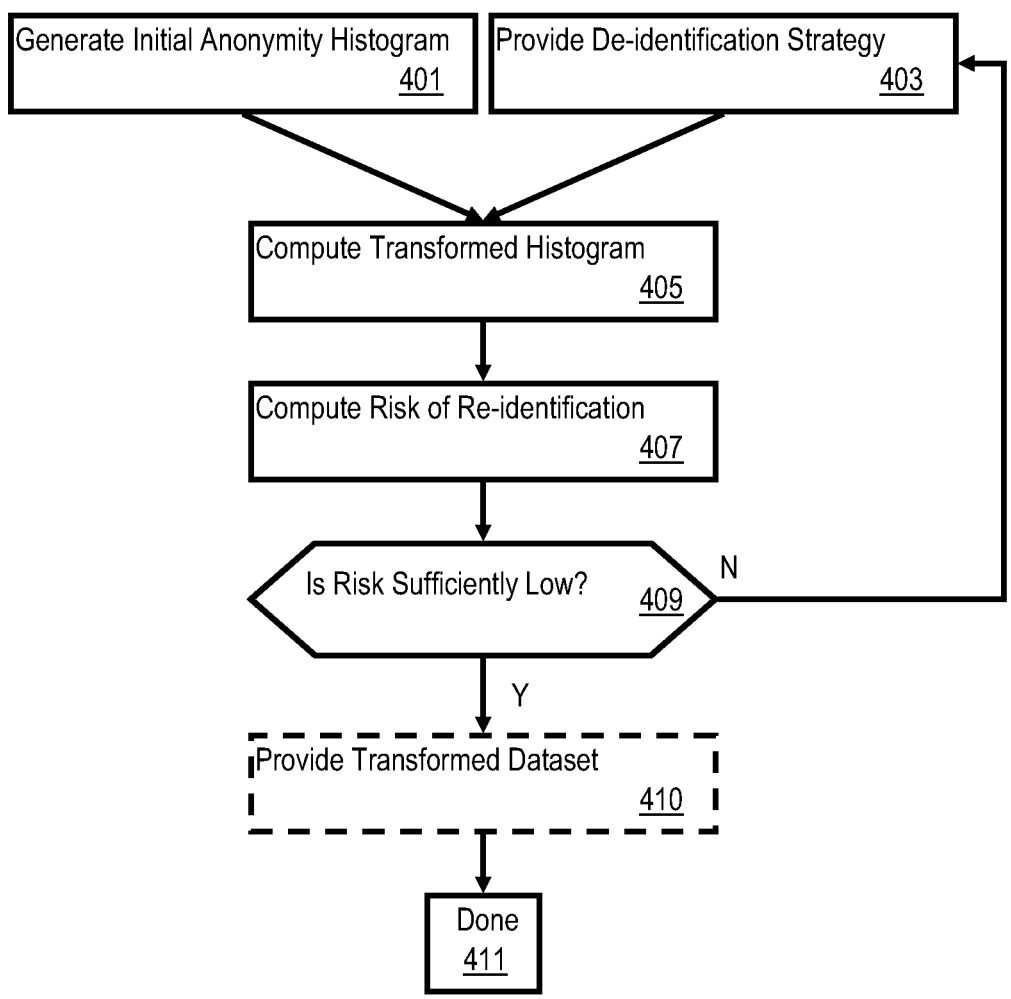
FIG. 4 illustrates a process prediction used within a larger context.

FIG. 4 illustrates a process 400 in accordance with an embodiment of the present disclosure. Process 400 describes how a predictive process may integrate with a larger process.

Process 400 begins at step 401. Steps 401, 403, 405, 407 are substantially identical to steps 301, 303, 305, 307 of process 300, respectively.

Step 409 of process 400 determines whether the predicted risk from step 407 is acceptable. If the dataset does not have sufficiently low risk, then control of process 400 returns to step 403, where a new de-identification strategy is generated, and steps 405, 407, 409 are repeated. If the outcome of step 409 is that the dataset using the strategy does have sufficiently low risk, then a solution has been found and control of process 400 transitions to optional step 410. At optional step 410, a transformed dataset may be supplied. For example, the user may apply the strategy, or the strategy may be directly applied to the dataset and a low risk dataset be produced. Thereafter, process 400 transitions to step 411 to wrap up and complete process 400.

Since anonymity is normally a real value (i.e., continuous or decimal), if anonymity values are converted into an integer value, an anonymity profile of dataset can be concisely expressed. In part, this is because anonymity is in a logarithmic scale, expressing magnitudes of difference. However, operations like round, round-up (i.e., ceiling), round-down (i.e., floor), will change the average risk profile of the anonymity histogram. An anonymity histogram may be used to model population anonymity and maintain an average risk profile of a sample to population re-identification.

Embodiments also may take into account an absolute level of re-identification risk already existing in a dataset, prior to application of suppression or other modification. Such an approach may provide improved data quality, in which data quality is quantified by how little a dataset was modified or needs to be modified. For example, if two datasets have equal risk of re-identification, the dataset that had been less modified is deemed to be of higher quality.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semi-conductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIG. 2 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Embodiments of the present disclosure include a system having one or more processing units coupled to one or more memories. The one or more memories may be configured to store software that, when executed by the one or more processing unit, allows practice of the embodiments described herein, at least by use of processes described herein, including at least in FIGS. 3-4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present disclosure may be dependent on various considerations, such as the speed or efficiency requirements of the system, the particular function, and the particular software or hardware systems being utilized.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

What is claimed is:

1. A method to predict a risk of re-identification of a de-identified dataset having a plurality of records comprising respective patient information, the method comprising steps of:
generating an anonymity histogram of the dataset;
providing one of a plurality of de-identification strategies that express mitigation techniques of the risk of re-identification to be applied to the dataset;
transforming the anonymity histogram into a predicted histogram under an assumption that the de-identification strategy is applied to the plurality of records of the dataset;
computing a predicted risk of re-identification based on the predicted histogram; and
when the risk of re-identification is higher than a predetermined risk of re-identification:
providing a different one of the plurality of de-identification strategies, and
repeating the steps of transforming and computing until the risk of re-identification is lower than the predetermined risk of re-identification.

2. The method of claim 1, wherein the plurality of de-identification strategies comprise field generalization, cell suppression and subsampling.

3. The method of claim 2, further comprising a step of estimating transformation of anonymity of the patient record using the de-identification strategy.

4. The method of claim 1, wherein the anonymity histogram is computed from the predetermined risk of re-identification.

5. The method of claim 1, further comprising the step of: applying the one of the plurality of predetermined de-identification strategies when the predicted risk of re-identification is less than the predetermined risk of re-identification, to produce a transformed de-identified dataset.

6. The method of claim 2, further comprising the step of: using different parameters to search for the de-identification strategy that results in a risk of re-identification below the predetermined risk of re-identification.

7. The method of claim 1, wherein the step of computing the predicted risk of re-identification comprises steps of computing a public risk of re-identification and computing an acquaintance risk of re-identification.

8. The method of claim 2, wherein the cell suppression comprises estimating anonymity from an entropy of a quasi-identifier.

9. The method of claim 1, wherein the anonymity histogram summarizes a risk of re-identification score for the plurality of records and comprises a step of generalizing at least one quasi-identifier.

10. The method of claim 9, wherein the step of generalizing includes generalizing a range that the at least one quasi-identifier is compared to.

11. The method of claim 1, wherein the step of transforming the anonymity histogram comprises lowering an entropy associated with a quasi-identifier.

12. A system to predict a risk of re-identification of a de-identified dataset having a plurality of records comprising respective patient information, the method comprising:
a processor configured to:
generate an anonymity histogram of the dataset;
provide one of a plurality of de-identification strategies that express mitigation techniques of the risk of re-identification to be applied to the dataset;
transform the anonymity histogram into a predicted histogram under an assumption that the de-identification strategy is applied to the plurality of records of the dataset;
compute a predicted risk of re-identification based on the predicted histogram; and
when the risk of re-identification is higher than a predetermined risk of re-identification:
provide a different one of the plurality of de-identification strategies, and
repeat the transform and compute acts until the risk of re-identification is lower than the predetermined risk of re-identification.

13. The system of claim 12, wherein the plurality of de-identification strategies comprise field generalization, cell suppression and subsampling.

14. The system of claim 13, wherein the processor is further configured to estimate transformation of anonymity of the patient record using the de-identification strategy.

15. The system of claim 12, wherein the processor is further configured to: use different parameters to search for the de-identification strategy that results in a risk of re-identification below the predetermined risk of re-identification.

16. The system of claim 12, wherein the predicted risk of re-identification is computed by computing a public risk of re-identification and computing an acquaintance risk of re-identification.

17. The system of claim 13, wherein cell suppression comprises estimating anonymity from an entropy of a quasi-identifier.

* * * * *

UNITED STATES PATENT AND TRADEMARK OFFICE
CERTIFICATE OF CORRECTION

PATENT NO. : 10,380,381 B2
APPLICATION NO. : 15/401221
DATED : August 13, 2019
INVENTOR(S) : Scaiano et al.

Page 1 of 1

It is certified that error appears in the above-identified patent and that said Letters Patent is hereby corrected as shown below:

On the Title Page

Item "(63)", Column 1, under "Related U.S. Application Data", Line 1, insert --filed on Dec. 19 2016-- after "Continuation-in-part of application No. 15/320,240,".

Page 2, Item "(56)", Column 1, under "OTHER PUBLICATIONS", Line 2, replace "anonymity"Proceedings" with "anonymity", Proceedings".

Page 2, Item "(56)", Column 1, under "OTHER PUBLICATIONS", Line 2, replace "conference" with "Conference".

Page 2, Item "(56)", Column 2, under "OTHER PUBLICATIONS", Line 14, replace "CRISIS" with "CRiSIS".

In the Specification

In Column 9, Line 62, replace "p_pop" with "ρ_pop".

In Column 9, Line 64, replace "p_pop" with "ρ_pop".

Signed and Sealed this
Twenty-ninth Day of October, 2019

Andrei Iancu
*Director of the United States Patent and Trademark Office*